(12) United States Patent
Liang et al.

(10) Patent No.: US 9,930,411 B2
(45) Date of Patent: Mar. 27, 2018

(54) NETWORKING METHOD AND NETWORKING DEVICE

(71) Applicant: ZTE Corporation, Shenzhen, Guangdong (CN)

(72) Inventors: Jianshi Liang, Shenzhen (CN); Fazhan Zheng, Shenzhen (CN); Tingting Wen, Shenzhen (CN); Qi Kong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/439,522

(22) PCT Filed: Sep. 22, 2013

(86) PCT No.: PCT/CN2013/083904
§ 371 (c)(1),
(2) Date: Apr. 29, 2015

(87) PCT Pub. No.: WO2014/067366
PCT Pub. Date: May 8, 2014

(65) Prior Publication Data
US 2015/0289017 A1    Oct. 8, 2015

(30) Foreign Application Priority Data
Nov. 5, 2012    (CN) .......................... 2012 1 0436212

(51) Int. Cl.
*H04N 7/173*    (2011.01)
*H04N 21/462*    (2011.01)
(Continued)

(52) U.S. Cl.
CPC ......... *H04N 21/4622* (2013.01); *H04L 45/00* (2013.01); *H04N 21/2665* (2013.01);
(Continued)

(58) Field of Classification Search
CPC .......... H04N 21/4622; H04N 21/2665; H04N 21/632; H04N 21/64322; H04N 21/64707; H04N 21/64746; H04L 45/00
See application file for complete search history.

(56) References Cited

U.S. PATENT DOCUMENTS

| 9,247,208 | B2 * | 1/2016 | Gemelos ................ H04H 20/12 |
| 2008/0052401 | A1 * | 2/2008 | Bugenhagen ........... H04L 12/14 |
| | | | 709/227 |

(Continued)

FOREIGN PATENT DOCUMENTS

| CN | 1825836 A | 8/2006 |
| CN | 101005434 A | 7/2007 |

(Continued)

OTHER PUBLICATIONS

International Search Report in international application No. PCT/CN2013/083904, dated Dec. 26, 2013.
(Continued)

*Primary Examiner* — Oleg Asanbayev
(74) *Attorney, Agent, or Firm* — Oppedahl Patent Law Firm LLC (57) ABSTRACT

Provided are a networking method and a networking device. The method is applied to the networking device, and the networking device is connected with at least one service switch and at least one streaming media server respectively. The method includes that a configuration module in the networking device configures networking configuration information of the at least one streaming media server, a control module in the networking device acquires the networking configuration information, and the control module sets a switching module through a setting interface of the switching module on the basis of the networking configuration information. According to the disclosure, the technical problem of complexity in a networking mode in the existing (Continued)

technology can be solved, and unified network management and configuration can be realized.

13 Claims, 4 Drawing Sheets

(51) Int. Cl.
    *H04L 12/701* (2013.01)
    *H04N 21/2665* (2011.01)
    *H04N 21/63* (2011.01)
    *H04N 21/643* (2011.01)
    *H04N 21/647* (2011.01)

(52) U.S. Cl.
    CPC ..... *H04N 21/632* (2013.01); *H04N 21/64322* (2013.01); *H04N 21/64707* (2013.01); *H04N 21/64746* (2013.01)

(56) References Cited

U.S. PATENT DOCUMENTS

2010/0095347 A1* 4/2010 Chase ................ H04L 12/1836
    725/151

2011/0289578 A1    11/2011    Bugenhagen
2013/0016722 A1    1/2013    Chase
2015/0143441 A1    5/2015    Chase

FOREIGN PATENT DOCUMENTS

| | | |
|---|---|---|
| CN | 101207532 A | 6/2008 |
| CN | 102594668 A | 7/2012 |
| CN | 102970251 A | 3/2013 |
| JP | 2009100118 A | 5/2009 |
| JP | 2009147795 A | 7/2009 |
| KR | 20050064098 A | 6/2005 |
| KR | 100998284 B1 | 12/2010 |
| RU | 2316907 C2 | 2/2008 |
| WO | 2008037219 A1 | 4/2008 |
| WO | 2010125749 A1 | 11/2010 |
| WO | 2012059842 A1 | 5/2012 |

OTHER PUBLICATIONS

English Translation of the Written Opinion of the International Search Authority in international application No. PCT/CN2013/083904, dated Dec. 26, 2013.
Supplementary European Search Report in European application No. 13851678.6, dated Sep. 17, 2015.

* cited by examiner

NETWORKING METHOD AND NETWORKING DEVICE

TECHNICAL FIELD

The disclosure relates to the field of network technology, and in particular to a networking method and a networking device.

BACKGROUND

In recent years, with the continuous development of a network technology, a triple-play technology (the telecommunication network, the broadcasting television network and the Internet) continuously penetrates into ordinary users, wherein an Internet Protocol Television (IPTV) technology provides an ordinary family with an interactive new television experience and feeling, such as time-shifted television, video on-demand, high-definition television and various non-audio-visual value-added services, and brings new audio and visual sensory experiences to a user by fusing voices, data and videos.

An IPTV service is mainly divided into three major parts, i.e.: 1, an IPTV management platform; 2, a transmission network; and 3, a user terminal.

The IPTV management platform mainly realizes functions of program acquisition, storage and serving; the program acquisition includes reception (from, for example, a satellite, a cable television network, and ground wireless and Internet Protocol (IP) networks) of programs, and compressed encoding and trans-coding, formatting, encryption, Digital Rights Management (DRM) packing, Electronic Program Guide (EPG) generation and the like of the programs; and the program storage and serving finish large-scale storage or broadcasting service of the programs generated after program acquisition and processing. Broadcasting refers to transmitting in an IP unicast or multicast manner a DRM authority/key for an encrypted video and audio streaming media program from a streaming media server to an authenticated user or user terminal equipment for decryption and playing.

The transmission network includes a backbone network/metropolitan area network, finishing the transmission of a video and audio data stream file between cities and within the cities, and a broadband access network finishes connection between a user and the metropolitan area network. Under a conventional IPTV networking mode, each external interface of blade servers of the streaming media server needs to connect a network cable to a service switch, and then the service switch distributes network messages to different user terminals.

The user terminal is responsible for receiving, processing and playing information such as IPTV program streaming media data and an EPG, and is configured with an IPTV set-top box which serves as a bridge between an ordinary television and a broadband transmission network, and by the IPTV set-top box, the television can receive a live or requested television program, and can be extended to enjoy service of Internet access, electronic business and the like.

However, the inventor of the application discovers that the abovementioned technology at least has the following technical problems in a process of implementing the technical solutions in the embodiment of the disclosure:

along with the increase of the number of the blade servers of the streaming media server, the number of the external interfaces increases, the number of the network cables connected with the service switch and the number of occupied service switch ports also increase, and due to the increase of the number of the network cables, complexity in networking is improved, and failure points are difficult to clear when the external interfaces fail.

Meanwhile, due to the continuous increase of streaming media data, local storage equipment of a conventional streaming media blade server cannot meet a storage requirement of the continuously increasing streaming media data.

A capability of the whole streaming media server can be improved by improving capabilities of the external interfaces of the blade servers and a storage capability of a local server in an existing technology; however, when the capabilities of the external interfaces of the blade servers and the storage capability of the local server are improved, it is necessary to continuously improve the existing technology, and along with the continuous increase of the media data, an improvement speed of the existing technology is far from overcoming the defects of insufficient capabilities of the external interfaces of the conventional blade servers and insufficient storage capability of the local server.

On the other hand, the problem of complexity in networking cannot be solved only by improving the capabilities of the external interfaces of the blade servers, and when the network fails, the failure cannot be timely and effectively cleared.

SUMMARY

The embodiments of the disclosure provide a networking method and a networking device, which solve the technical problem of complexity in a network mode in the existing technology and achieve a technical effect of unified network management and configuration.

An embodiment of the disclosure provides a networking method, which is applied to a network device, the networking device being connected with at least one service switch and at least one streaming media server respectively, the method including that: a configuration module in the networking device configures networking configuration information of the at least one streaming media server; a control module in the networking device acquires the networking configuration information; and the control module sets a switching module through a setting interface of the switching module on the basis of the networking configuration information.

Preferably, the networking configuration information may include information of a networking mode, and configuration information of M external interfaces in an external interface list of the switching module in the networking device, wherein M is an integer greater than or equal to 1.

Preferably, the step that the switching module is set may be implemented as follows: the control module sets attributes of the M external interfaces in the switching module.

Preferably, the attributes may include Virtual Local Area Networks (VLAN) Identifiers (ID) and tags of the external interfaces, and a convergent attribute of service.

Preferably, after the step that the control module sets the switching module through the setting interface of the switching module on the basis of the networking configuration information, the method further may includes that a detection module in the networking device detects the M external interfaces in the external interface list of the switching module to determine whether each external interface in the M external interfaces is in a valid state or invalid state.

Preferably, before the step that the detection module determines whether each external interface in the M external interfaces is in the valid state or invalid state, the method further may include that the M external interfaces are divided into P groups, wherein P is smaller than or equal to M; at least one group in the P groups includes at least one external interface, not exceeding M external interfaces; and each external interface can only belong to one group.

Preferably, after the step that the detection module determines whether each external interface in the M external interfaces is in the valid state or invalid state, the method further may include that when a first external interface in the M external interfaces is in the invalid state, the first external interface is removed from a convergent port corresponding to the external interface list.

Preferably, after the step that the detection module determines whether each external interface in the M external interfaces is in the valid state or invalid state, the method further may include that when a second external interface in the M external interfaces is in the valid state and the second external interface does not belong to the convergent port corresponding to the external interface list, the second external interface is added into the convergent port corresponding to the external interface list.

Preferably, a networking mode may include: media service and storage service hybrid networking; or media service and storage service separated networking; or live telecast private network networking; or media inbound and media outbound separated and storage service hybrid networking; or media inbound and media outbound separated and storage service separated networking; or media inbound and media outbound separated live telecast private network networking.

Another embodiment of the disclosure provides a networking device, which includes a configuration module, a switching module and a control module, wherein the configuration module is configured to configure networking configuration information of at least one streaming media server;

the switching module is connected with at least one service switch and the at least one streaming media server respectively, and is configured to being subjected to setting operation of the control module; and the control module is connected with the configuration module and the switching module, and is configured to acquire the networking configuration information from the configuration module, and set the switching module through a setting interface of the switching module on the basis of the networking configuration information.

Preferably, the configuration module may include a first configuration sub-module, configured to configure information of a networking mode; and a second configuration sub-module, configured to configure configuration information of M external interfaces in an external interface list in the switching module, wherein M is an integer greater than or equal to 1.

Preferably, the control module may include a first control sub-module configured to set VLAN IDs and tags of the external interfaces of the switching module, and a second control sub-module configured to set a convergent attribute of service.

Preferably, the networking device further may include a detection module, configured to detect the M external interfaces of the switching module to determine whether each external interface in the M external interfaces is in a valid state or invalid state.

Preferably, the networking device further may include a grouping module, configured to divide the M external interfaces into P groups, wherein P is smaller than or equal to M; at least one group in the P groups includes at least one external interface, not exceeding M external interfaces; and each external interface can only belong to one group.

Preferably, the detection module may include: a first detection sub-module, configured to, when a first external interface in the M external interfaces is in the invalid state, remove the first external interface from a convergent port corresponding to the external interface list; and a second detection sub-module, configured to, when a second external interface in the M external interfaces is in the valid state and the second external interface does not belong to the convergent port corresponding to the external interface list, add the second external interface into the convergent port corresponding to the external interface list.

The one or more technical solutions provided by the embodiments of the disclosure at least have technical effects or advantages as follows:

1. with the adoption of the technical solution of acquiring the networking configuration information in the configuration module to set the switching module in the networking device through the control module to enable the switching module to connect the service switch with the streaming media server, the technical problem of complexity in the networking mode when the service switch is connected with the streaming media server through excessive network cables in the existing technology is solved, so that technical effects of networking configuration information improvement and unified network management and configuration are achieved;

2. the attributes of the external interfaces of the switching module are configured in the configuration module, that is, the VLAN IDs and tags of the external interfaces and the convergent port of the service are configured to identify service types of transmitted messages, so that the technical problem of high line disorder rate caused by the continuous increase of the network cables along with the increase of the number of blade servers when different types of service are required to be transmitted through different network cables in the existing technology is effectively solved, the tags are adopted to identify the service types or destination addresses to which the messages are to be transmitted, the number of the network cables is reduced, and meanwhile, transmission accuracy is ensured; and 3. with the adoption of the technical scheme of detecting the external interfaces of the switching module in real time through the detection module in the networking device after the control module sets the switching module, the technical problem that a failure point cannot be effectively cleared when a network fails in the existing technology is solved, and technical effects of effectively monitoring a networking line, timely clearing a failure and improving failure tolerance of the network are achieved.

DETAILED DESCRIPTION

The disclosure provides a networking method and device, which are adopted to solve the complexity problem of a networking mode in the existing technology.

In order to solve the complexity problem of the networking mode, the general thinking of the technical solution in the embodiment of the disclosure is as follows:

in a networking device arranged between a media server and a service switch, a configuration module configures networking information according to a networking requirement; then a control module acquires the networking information and configures external interfaces of a switching module; and after the external interfaces of the switching module are configured, when inbound messages (media service and storage service) contain different VLAN tags, the switching module may determine destination streaming media blade servers according to the VALN tags and a destination Media Access Control (MAC) address; when streaming media blade servers transmit streaming media data to an outer network, the switching module receives the streaming media data, and outputs outbound messages to the service switch, wherein the outbound messages also contain different VLAN tags, and are forwarded to different networks under the cooperation of the service switch; and finally a detection module detects the external interfaces of the switching module in real time.

In order to better understand the technical solution, the technical solution is described below with reference to the drawings and specific implementation modes in detail.

Figure 1:
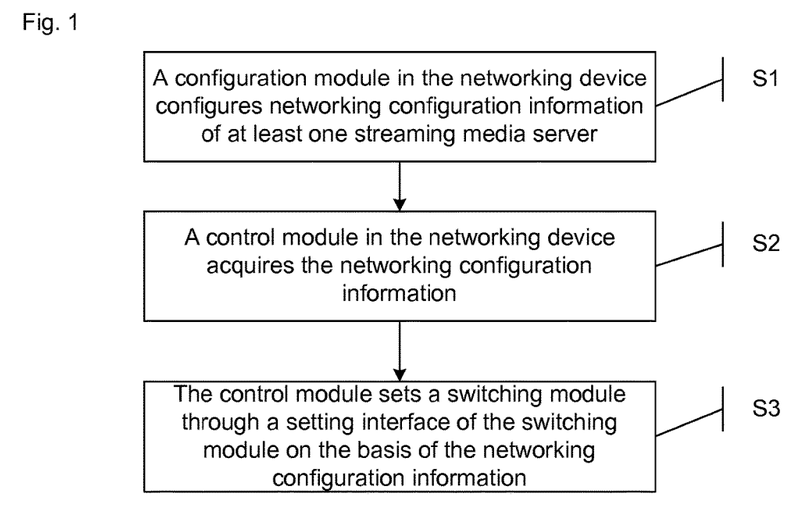
FIG. 1 is a flowchart of a networking method according to an embodiment of the disclosure.

FIG. 1 is a flowchart of a networking method provided by an embodiment of the disclosure. The method is applied to a networking device, the networking device is connected with at least one service switch and at least one streaming media server respectively, and is applied to an IPTV, and description is given below by taking the IPTV as an example in detail.

Step S1 includes that a configuration module in the networking device configures networking configuration information of the at least one streaming media server, wherein the networking configuration information configured by the configuration module includes information of a networking mode, and configuration information of M external interfaces, included in an external interface list, of a switching module in the networking device, wherein M is an integer greater than or equal to 1.

The step of setting the switching module through a control module includes that the control module sets attributes of the M external interfaces in the switching module. The attributes specifically include VLAN IDs and tags of the external interfaces, and a convergent attribute of a service group.

A content provider and video acquisition equipment provide the streaming media server with streaming media resources in front-end equipment of the IPTV at first, the streaming media server receives the streaming media resources, and when terminal users need the streaming media resources, the streaming media resources are forwarded to different users. In an implementation mode of the scheme, the configuration module in the networking device configures the networking configuration information of the at least one streaming media server, the streaming media server includes multiple blade servers, each blade server at least includes a media service external interface and a storage service external interface as well as a blade server external interface for providing external signalling service; the configuration module configures the external interfaces of the switching module according to different service, and in the embodiment of the disclosure, the number of the configured external interfaces may be greater than or equal to 1 and smaller than or equal to 8.

For example, in the IPTV, it is necessary to determine a networking mode described in the disclosure at first, then it is determined that the external interfaces are required to be divided into a plurality of service groups (i.e. trunk groups) according to the networking mode, and finally which external interfaces are included in each service group is determined. For actual configuration, each service group includes at least one external interface, maximally 8 external interfaces, and each external interface can only belong to one service group; and moreover, the number of the external interfaces in all the service groups may not exceed the total number of all the external interfaces.

Step S2 includes that the control module in the networking device acquires the networking configuration information.

Step S3 includes that the control module sets a switching module through a setting interface of the switching module on the basis of the networking configuration information.

Step S2 and Step S3 are described together below in detail.

In a specific implementation process, the switching module can identify which service the transmitted streaming media data belongs to according to the configured attributes of the external interfaces and then forward the streaming media data to different user terminals according to different service. For example, in the IPTV, when the service transmitted by the streaming media server is live telecast service, the service contains a tag of the live telecast service, the external interface provided by the switching module is marked with a VLAN ID for identifying the live telecast service, and the service is transmitted to a destination outer network through the service switch in combination with a destination IP address of a media message.

Similarly, when the service transmitted by the streaming media server is an on-demand service, the service contains a tag of the on-demand service, the external interface provided by the switching module is marked with a VLAN ID, and a corresponding destination outer network in need of the on-demand service is found through the service switch according to the VLAN ID and the destination IP address in the media message.

Of course, the service may be signalling service, and the signalling here refers to interaction between an IPTV set-top box of a terminal user and the IPTV streaming media server, for example, when the user watches a program, a program selection signal is transmitted to the IPTV set-top box through a remote controller, and the IPTV set-top box identifies the transmitted signal to establish a connection between the IPTV streaming media server and an ordinary television. Therefore, signalling can provide not only on-demand service but also live telecast service for the user, and the IPTV set-top box is critical equipment for providing the signalling service.

The configuration module stores the configuration information of the external interfaces of the switching module, and also stores the information of a networking mode of the switching module, and the information of a networking mode is described below in detail.

The information of a networking mode includes: media service and storage service hybrid networking; or media service and storage service separated networking; or live telecast private network networking; or media inbound and media outbound separated and storage service hybrid networking; or media inbound and media outbound separated and storage service separated networking; or media inbound and media outbound separated live telecast private network networking.

Figure 2:
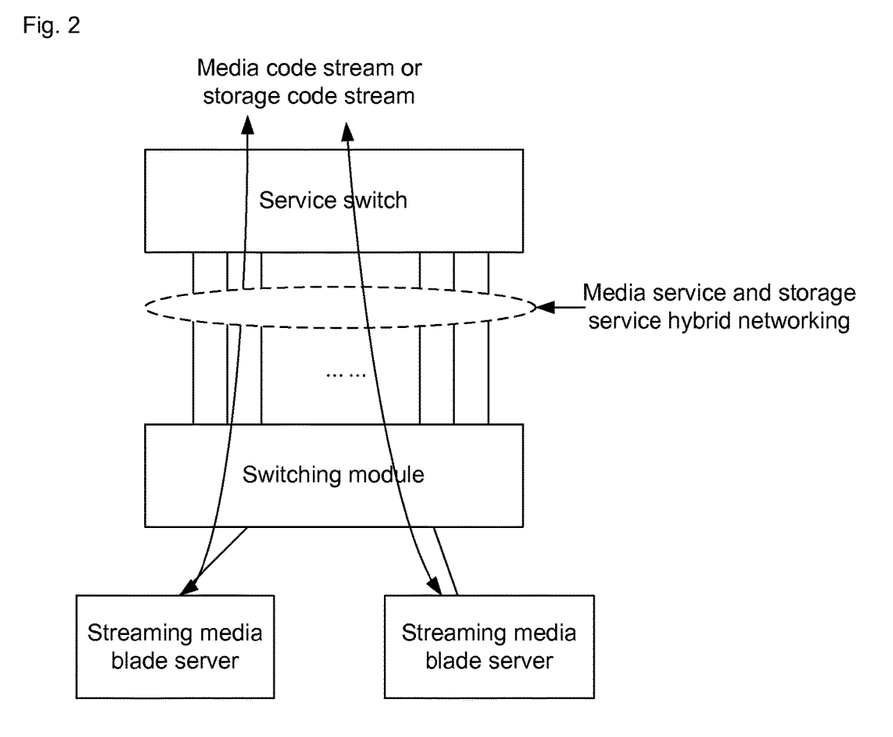
FIG. 2 is a diagram of media service and storage service hybrid networking which is a networking mode according to an embodiment of the disclosure.

With regard to media service and storage service hybrid networking, as shown in FIG. 2, external interfaces of the blade servers in the media server are divided into media service external interfaces and storage service external interfaces, which are listed in the external interface list, and the media service external interfaces and the storage service external interfaces are converged in the same logic port. The external interfaces of the switching module are connected to the service switch, and are configured to be converged at the corresponding switch port. Convergence here can increase a bandwidth of a transmission line, and can realize load balance of the streaming media data transmitted on the transmission line, that is, a bandwidth converged on the transmission line at one end is allocated to each line in a balanced way. Here, media service refers to inbound and outbound service, signalling service, live telecast service, and on-demand service; and storage service is configured for external storage equipment. For example, when a user uses the on-demand service in the IPTV, a video selected by the user is stored in the external storage equipment in advance, of course, when the user has no time for watching a live telecast program, the live telecast program can be requested to be recorded. At this time, it is necessary for the external storage equipment to provide the storage service. Therefore, the storage service is a read-write operation over the streaming media data in the external storage equipment. Meanwhile, the IPTV provides interactive network service, and the user can flexibly interact with the streaming media server to acquire a required television program. Therefore, signalling service provides an interaction platform, and can provide on-demand operation as well as live telecast operation.

Figure 3:
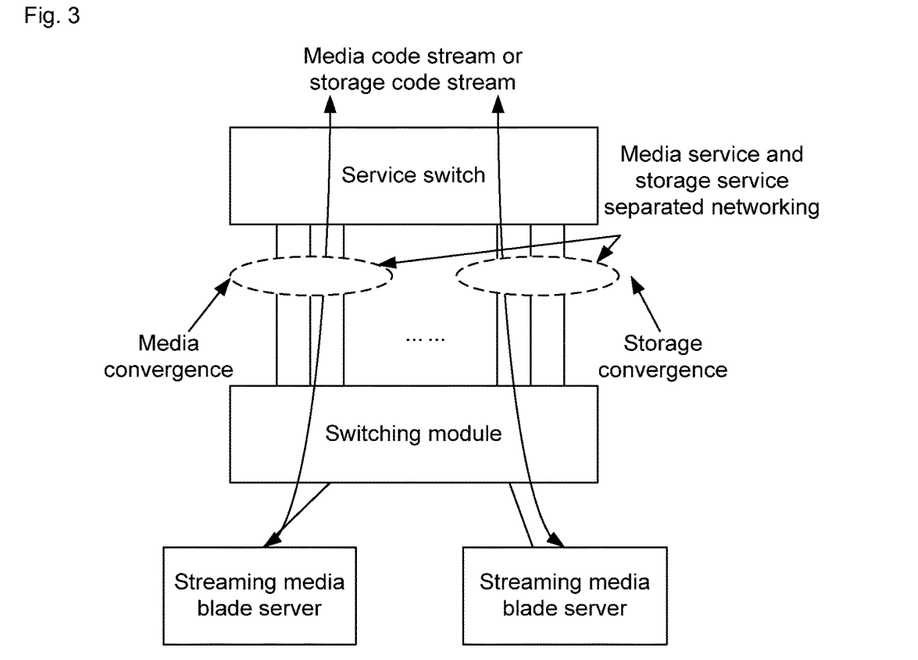
FIG. 3 is a diagram of a media service and storage service separated networking which is a networking mode according to an embodiment of the disclosure.

With regard to media service and storage service separated networking, as shown in FIG. 3, the media service external interfaces and the storage service external interfaces are included in the external interface list, but the media service external interfaces and the storage service external interfaces are in two convergent ports respectively, the media service external interfaces are connected to the switch, and the corresponding switch ports are configured to be convergent; and the storage service can be connected with the storage equipment directly or through the switch. Therefore, the storage service external interfaces may be convergent or may be non-convergent. Such a networking mode may support the on-demand service, and may also support the live telecast service and the storage service.

Figure 4:
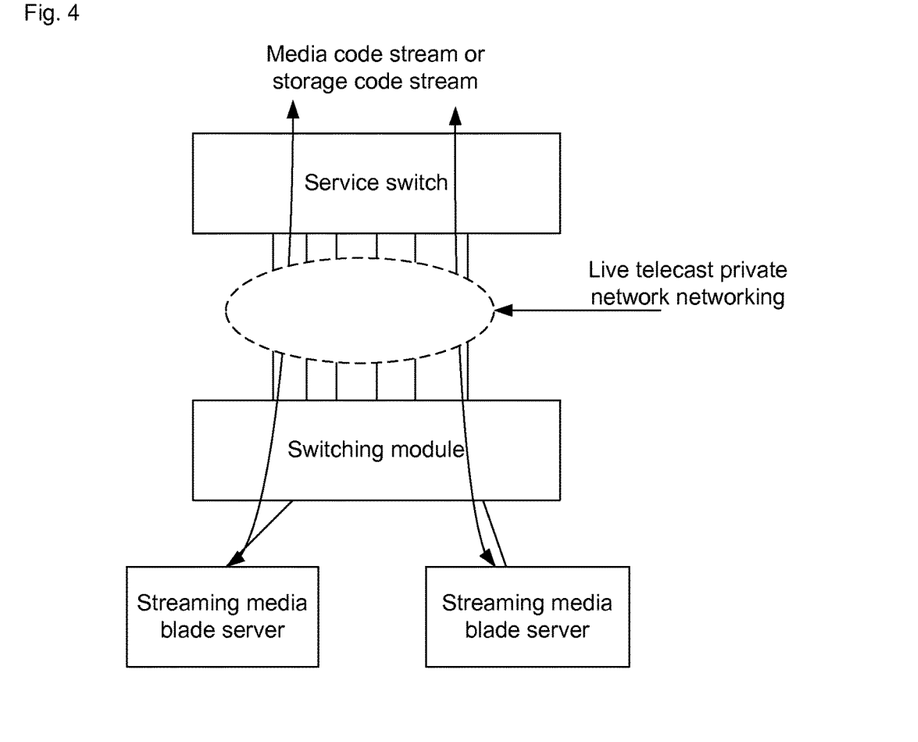
FIG. 4 is a diagram of live telecast private network networking which is a networking mode according to an embodiment of the disclosure.

With regard to live telecast private network networking, as shown in FIG. 4, the external interface list only includes the media service external interfaces, and does not include on-demand service interfaces; the media service external interfaces are connected to the switch, and the corresponding ports of the service switch are also configured to be convergent. For example, remote video tutoring adopts live telecast private network networking, which cannot support on-demand operation, that is, operation such as pause, back and fast forward over a remote video can not be implemented. The on-demand service is not limited to the above-mentioned remote video tutoring, and also includes other real-time programs such as live Olympic events.

Figure 5:
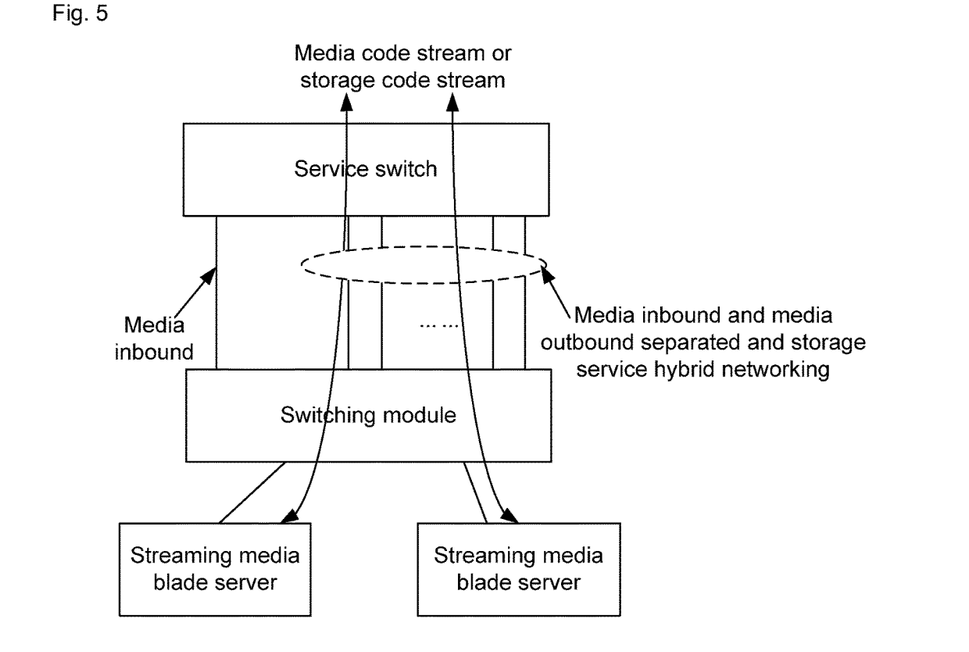
FIG. 5 is a diagram of media inbound and media outbound separated and storage service hybrid networking which is a networking mode according to an embodiment of the disclosure.

With regard to media inbound and media outbound separated and storage service hybrid networking, as shown in FIG. 5, the external interface list is divided into a media inbound service external interface list and a media outbound service and storage hybrid external interface list; media inbound service external interfaces are connected to the service switch, and the corresponding ports of the service switch are configured to be convergent; and media outbound service and storage hybrid external interfaces are connected to the service switch, and the corresponding ports of the service switch are also configured to be convergent. For example, when the streaming media data is transmitted in an inner network, and meanwhile, the streaming media data is required to be transmitted to other IPTV users in an external network, it is necessary to separate media inbound from media outbound, thereby ensuring the independence of the inner private network.

Figure 6:
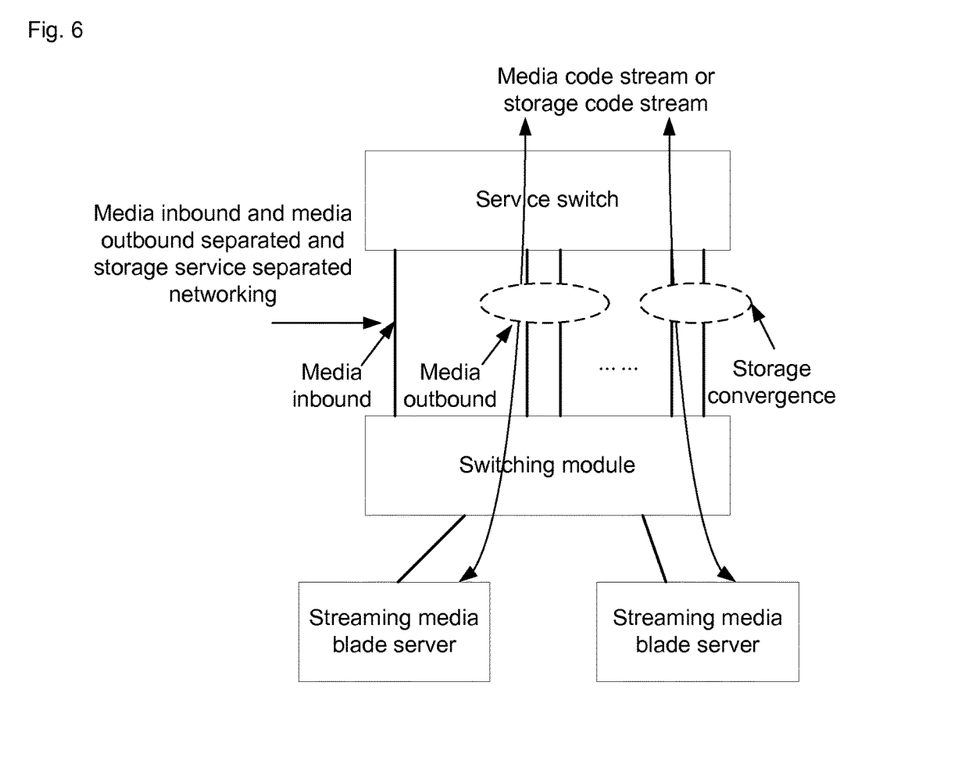
FIG. 6 is a diagram of media inbound and media outbound separated and storage service separated networking which is a networking mode according to an embodiment of the disclosure.

With regard to media inbound and media outbound separated and storage service separated networking, as shown in FIG. 6, the external interface list is divided into a media inbound service external interface list, a media outbound service external interface list, and a storage service external interface list; media inbound service external interfaces are connected to the service switch, and the corresponding ports of the service switch are configured to be convergent; media outbound service external interfaces are connected to the service switch, and the corresponding ports of the service switch are configured to be convergent; and storage service external interfaces are connected to the switch or directly connected with the storage equipment, so that the storage service external interfaces may be convergent or non-convergent.

Figure 7:
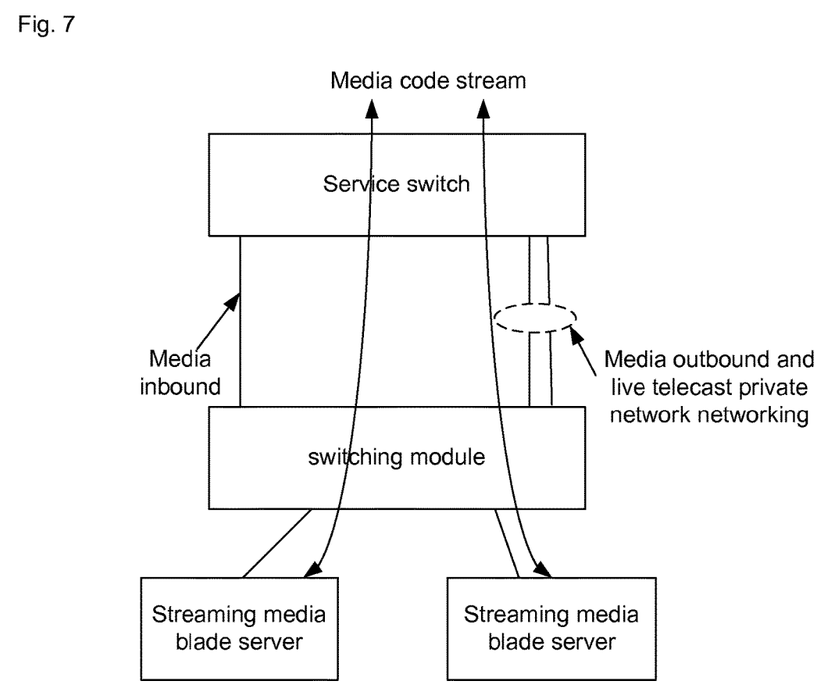
FIG. 7 is a diagram of media inbound and media outbound separated live telecast private network networking which is a networking mode according to an embodiment of the disclosure.

With regard to media inbound and media outbound separated live telecast private network networking, as shown in FIG. 7, the external interface list is divided into the media inbound service external interface list and the media outbound service external interface list; and the external interfaces are connected to the service switch, and the corresponding ports of the switch are configured to be convergent.

After the control module sets the switching module through software, the networking method further includes that the detection module in the networking device detects the M external interfaces of the switching module to determine whether each external interface in the M external interfaces is in a valid state or invalid state.

Specifically, when a first external interface in the M external interfaces is in the invalid state, the first external interface is removed from a convergent port corresponding to the external interface list.

In a specific implementation mode, when a physical link of a data transmission line is interrupted, a port of the line is deleted from a convergent trunk group, that is, the port will not be adopted to transmit data any longer, and for the trunk group, the port does not belong to the trunk group any longer. According to the convergent attribute, the transmitted streaming media data is subjected to load balance to prevent the concentration of traffic on one external interface so as to avoid bandwidth resource waste of the other interfaces.

A link state of a port is a link state of the switching module, and when the link state is a down state, it refers to a state with a hardware problem. For example, damage of an optical module device of the external interface, or breakage of an optical fibre or crash (down) of the external service switch may cause an abnormal state of the external interface of the switching module, thereby leading the external interface into the invalid state.

When a second external interface in the M external interfaces is in the valid state and the second external interface does not belong to the convergent port corresponding to the external interface list, the second external interface is added into the convergent port corresponding to the external interface list.

In a specific implementation mode, there are valid ports if there are invalid ports, and when one external interface is valid, the port of the line is added into the convergent port. That is, when the external interface in the invalid state in the configured external interfaces is in an UP state, the port of the link in the UP state is added into the convergent port. Whether the external interfaces are in the valid state or invalid state is only relevant to the configured external interfaces, and for non-configured external interfaces, even the external interfaces are in the UP state, the external interfaces will not be added into the convergent port.

After the streaming media data is transmitted to the service switch, a user end matched with the transmitted streaming media data is found with the cooperation of the service switch, and the streaming media data required by a user is transmitted to the user. The user end here may be a personal computer, an ordinary television plus a set-top box, or a mobile phone with a receiving Third-Generation (3G) network.

Of course, the networking method is not only applied to the IPTV, but also can be implemented in other networks.

Based on the same inventive concept, another embodiment of the disclosure provides a networking device, which is for implementing the networking method of the disclosure.

Figure 8:
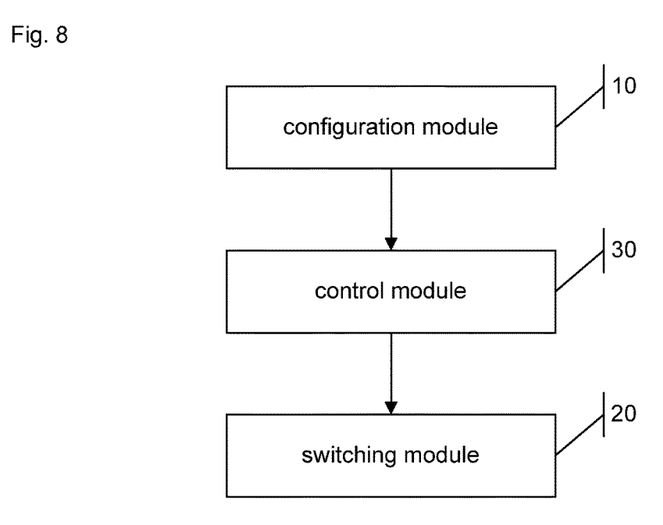
FIG. 8 is a module diagram of a networking device according to an embodiment of the disclosure.

As shown in FIG. 8, the networking device includes: a configuration module 10, configured to configure networking configuration information of at least one streaming media server; a switching module 20, connected with at least one service switch and the at least one streaming media server respectively and configured to being subjected to setting operation of a control module; and the control module 30, connected with the configuration module and the switching module and configured to acquire the networking configuration information from the configuration module, and set the switching module through a setting interface of the switching module on the basis of the networking configuration information.

The configuration module specifically includes: a first configuration sub-module, configured to configure information of a networking mode; and a second configuration sub-module, configured to configure configuration information of M external interfaces in an external interface list in the switching module, wherein M is an integer greater than or equal to 1.

The control module specifically includes: a first control sub-module configured to set VLAN IDs and tags of the external interfaces of the switching module; and a second control sub-module configured to set a convergent attribute of service.

The networking device further includes a detection module, configured to detect the M external interfaces of the switching module to determine whether each external interface in the M external interfaces is in a valid state or invalid state.

The networking device further includes a grouping module, configured to divide the M external interfaces into P groups, wherein P is smaller than or equal to M; at least one group in the P groups includes at least one external interface, not exceeding M external interfaces; and each external interface can only belong to one group.

The detection module specifically includes: a first detection sub-module, configured to, when a first external interface in the M external interfaces is in the invalid state, remove the first external interface from a convergent port corresponding to the external interface list; and a second detection sub-module, configured to, when a second external interface in the M external interfaces is in the valid state and the second external interface does not belong to the convergent port corresponding to the external interface list, add the second external interface into the convergent port corresponding to the external interface list.

The networking device introduced in the embodiment is the networking device for implementing the networking method of the disclosure, so that those skilled in the art can know specific implementation modes and various variations of the networking device in the embodiment based on the networking method introduced in the embodiment of the disclosure, and the networking device will not be introduced here in detail. The networking device for implementing the networking method of the disclosure by those skilled in the art shall fall within the scope of protection of the disclosure.

The one or more technical solutions provided by the embodiments of the disclosure at least have technical effects or advantages as follows:

1. with the adoption of the technical solution of acquiring the networking configuration information in the configuration module to set the switching module in the networking device through the control module to enable the switching module to connect the service switch with the streaming media server, the technical problem of complexity of the networking mode when the service switch is connected with the streaming media server through excessive network cables in the existing technology is solved, so that technical effects of networking configuration information improvement and unified network management and configuration are achieved;

2. the attributes of the external interfaces of the switching module are configured in the configuration module, that is, the VLAN IDs and tags of the external interfaces and the convergent port of the service are configured to identify service types of transmitted messages, so that the technical problem of high line disorder rate caused by the continuous increase of the network cables along with the increase of the number of blade servers when different types of service are required to be transmitted through different network cables in the existing technology is effectively solved, the tags are adopted to identify the service types or destination addresses to which the messages are to be transmitted, the number of the network cables is reduced, and meanwhile, transmission accuracy is ensured; and 3. with the adoption of the technical scheme of detecting the external interfaces of the switching module in real time through the detection module in the networking device after the control module sets the switching module, the technical problem that a failure point cannot be effectively cleared when a network fails in the existing technology is solved, and technical effects of effectively monitoring a networking line, timely clearing a failure and improving failure tolerance of the network are achieved.

Those skilled in the art should know that a method, a system or a computer program product can be provided by the embodiments of the disclosure. Therefore, a complete hardware embodiment, a complete software embodiment or a software and hardware combined embodiment can be adopted in the disclosure. Moreover, a computer program product implemented in one or more computer-available storage media (including, but not limited to, a disk memory, a Compact Disc Read-Only Memory (CD-ROM) and an optical memory) including computer-available program codes can be adopted in the disclosure.

The disclosure is described with reference to a flowchart and/or block diagrams of the method, the equipment (system) and the computer program product according to the embodiments of the disclosure. It should be understood that each flow and/or block in the flowchart and/or the block diagrams and a combination of the flows and/or blocks in the flowchart and/or the block diagrams can be implemented by virtue of computer program instructions. These computer program instructions can be provided for a universal computer, a special computer, an embedded processor or a processor of other programmable data processing equipment to generate a machine, so that a device for realizing a function specified in one or more flows in the flowchart and/or one or more blocks in the block diagrams can be generated by virtue of the instructions executed by the computer or the processor of the other programmable data processing equipment.

These computer program instructions can also be stored in a computer-readable memory capable of guiding the computer or the other programmable data processing equipment to work in a specific manner, so that a product including an instruction device can be generated by virtue of the instructions stored in the computer-readable memory, and the instruction device realizes the function specified in the one or more flows in the flowchart and/or the one or more blocks in the block diagrams.

These computer program instructions can also be loaded to the computer or the other programmable data processing equipment, so that a series of operating steps can be executed in the computer or the other programmable data processing equipment for processing implemented by the computer, and a step for realizing the function specified in the one or more flows in the flowchart and/or the one or more blocks in the block diagrams is provided by the instructions executed in the computer or the other programmable data processing equipment.

Although the preferred embodiments of the disclosure have been described, those skilled in the art can make additional variations and modifications to the embodiments once knowing basic creative concepts. Therefore, the attached claims are intended to be explained to include the preferred embodiments and all the variations and modifications falling within the scope of the disclosure.

Obviously, those skilled in the art can make various modifications and variations to the disclosure without departing from the spirit and scope of the disclosure. Thus, if these modifications and variations of the disclosure fall within the scope of the claims of the disclosure and equivalent technologies thereof, the disclosure is also intended to include these modifications and variations.

What is claimed is:

1. A networking method, applied to a networking device, the networking device being connected with at least one service switch and at least one streaming media server respectively, wherein the networking device and at least one streaming media server are in an Internet Protocol Television (IPTV) network, the method comprising:
    configuring, by a configuration module in the networking device, networking configuration information of the at least one streaming media server;
    acquiring, by a control module in the networking device, the networking configuration information; and
    setting, by the control module, attributes of M external interfaces in a switching module in the networking device through a setting interface of the switching module on a basis of the networking configuration information, wherein each of the M external interfaces in a switching module connects one external interface of service switch;
    wherein the attributes of M external interfaces comprise Virtual Local Area Networks (VLAN) Identifiers (ID) and tags of the M external interfaces;
    receiving, by the switching module, streaming media data containing a destination IP address and a tag which indicates the service type of the streaming media data from the at least one streaming media server;
    wherein the service type of the streaming media data includes live telecast service and on-demand service;
    identifying, by the switching module, service type of the streaming media data according to the tags the M external interfaces;
    forwarding, by the switching module, the streaming media data to different user terminals according to the destination IP address and VLAN ID through one connected external interface of service switch;
    wherein the networking configuration information comprises information of a networking mode, and configuration information of M external interfaces in an external interface list of the switching module in the networking device, where M is an integer greater than or equal to 1.

2. The method according to claim 1, after setting, by the control module, the switching module through the setting interface of the switching module on a basis of the networking configuration information, the method further comprising:
    detecting, by a detection module in the networking device, M external interfaces, comprised in an external interface list, of the switching module to determine whether each external interface in the M external interfaces is in a valid state or invalid state.

3. The method according to claim 2, before determining whether each external interface in M external interfaces is in the valid state or invalid state, the method further comprising:
    dividing the M external interfaces into P groups, wherein P is smaller than or equal to M; at least one group in the P groups comprises at least one external interface, not exceeding M external interfaces; and each external interface only belongs to one group.

4. The method according to claim 2, after determining whether each external interface in M external interfaces is in the valid state or invalid state, the method further comprising:
    when a first external interface in the M external interfaces is in the invalid state, removing the first external interface from a convergent port corresponding to the external interface list.

5. The method according to claim 4, after determining whether each external interface in M external interfaces is in the valid state or invalid state, the method further comprising:

when a second external interface in the M external interfaces is in the valid state and the second external interface does not belong to the convergent port corresponding to the external interface list, adding the second external interface into the convergent port corresponding to the external interface list.

6. The method according to claim 1, wherein the networking mode comprises:

media service and storage service hybrid networking; or media service and storage service separated networking; or live telecast private network networking; or media inbound and media outbound separated and storage service hybrid networking; or media inbound and media outbound separated and storage service separated networking; or media inbound and media outbound separated live telecast private network networking.

7. The method according to claim 1, after setting, by the control module, the switching module through the setting interface of the switching module on a basis of the networking configuration information, the method further comprising: detecting, by a detection module in the networking device, the M external interfaces, comprised in the external interface list, of the switching module to determine whether each external interface in the M external interfaces is in a valid state or invalid state.

8. A networking device which connects with at least one service switch and at least one streaming media server respectively, wherein the networking device and at least one streaming media server are in an Internet Protocol Television (IPTV) network, comprises a processor for executing programmed instructions comprising:

configuring networking configuration information of at least one streaming media server;

connecting with at least one service switch and the at least one streaming media server respectively, and being subjected to setting operation; and acquiring the networking configuration information, and setting attributes of M external interfaces in a switching module in the networking device through a setting interface of the switching module on a basis of the networking configuration information, wherein each of the M external interfaces in a switching module connects one external interface of service switch;

wherein the attributes of M external interfaces comprise Virtual Local Area Networks (VLAN) Identifiers (ID) and tags of the M external interfaces;

receiving streaming media data containing a destination IP address and a tag which indicates the service type of the streaming media data from the at least one streaming media server;

wherein the service type of the streaming media data includes live telecast service and on-demand service;

identifying service type of the streaming media data according to the tags the M external interfaces;

forwarding the streaming media data to different user terminals according to the destination IP address and VLAN ID through one connected external interface of service switch;

wherein the networking configuration information comprises information of a networking mode, and configuration information of M external interfaces in an external interface list of the switching module in the networking device, where M is an integer greater than or equal to 1.

9. The networking device according to claim 8, wherein the processor for executing programmed instructions comprising:

configuring information of a networking mode; and configuring configuration information of M external interfaces in an external interface list in the switching module, wherein M is an integer greater than or equal to 1.

10. The networking device according to claim 8, wherein the processor for executing programmed instructions comprising:

setting Virtual Local Area Network (VLAN) Identifiers (ID) and tags of M external interfaces of the switching module; and setting a convergent attribute of service.

11. The networking device according to claim 8, wherein the processor for executing programmed instructions comprising:

detecting M external interfaces of the switching module to determine whether each external interface in the M external interfaces is in a valid state or invalid state.

12. The networking device according to claim 8, wherein the processor for executing programmed instructions comprising:

dividing M external interfaces into P groups, wherein P is smaller than or equal to M; at least one group in the P groups comprises at least one external interface, not exceeding M external interfaces; and each external interface only belongs to one group.

13. The networking device according to claim 8, wherein the processor for executing programmed instructions comprising:

when a first external interface in M external interfaces is in the invalid state, removing the first external interface from a convergent port corresponding to an external interface list; and when a second external interface in the M external interfaces is in the valid state and the second external interface does not belong to the convergent port corresponding to the external interface list, adding the second external interface into the convergent port corresponding to the external interface list.

* * * * *